UNITED STATES PATENT OFFICE 2,534,692

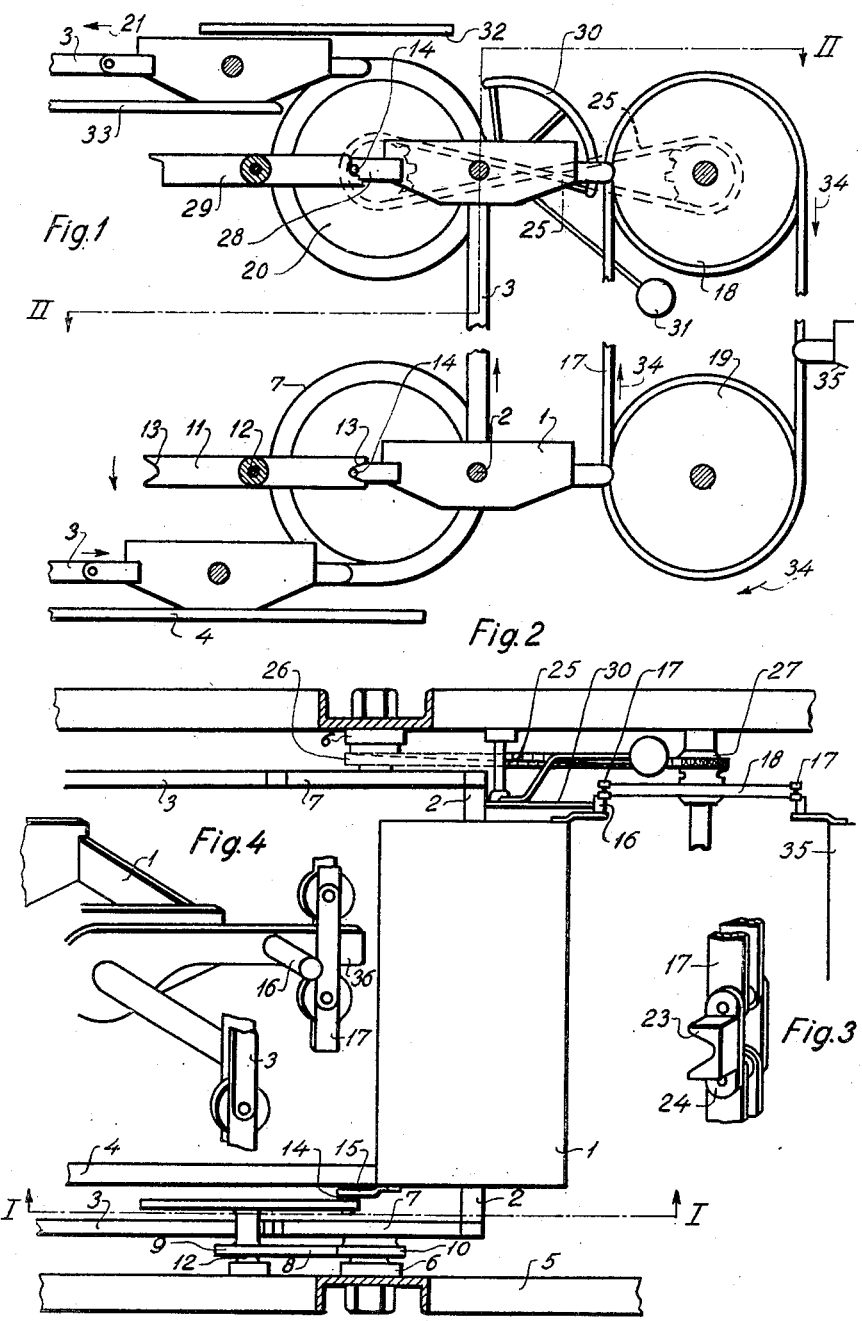

CONVEYER

Kai Christian Sophus Aasted, Gentofte, Copenhagen, Denmark

Application November 2, 1946, Serial No. 707,486
In Denmark July 10, 1946

7 Claims. (Cl. 198—138)

Conveyor means for apparatus for casting chocolate, cream and sugar goods are known which consist of a chain-conveyor, on which are mounted a plurality of freely rotatable frames adapted to carry the moulds and which are provided with supporting elements arranged to cooperate with guiding elements, in such a way that the spatial position of the frames is determined independently of the direction of travel of the chain-conveyor. Known conveyors of this kind, however, require at least two separate supporting elements firmly secured to each frame, and arranged to cooperate with fixed guiding elements. In these devices, when the direction of travel of the frames is changed, difficulty is encountered in determining and maintaining the position of the frames as they shift from one guiding surface to another. Since the shift cannot ordinarily be effected with the necessary precision to insure proper engagement, one of the guiding surfaces is resiliently mounted. This, however, complicates the construction of the conveyor. Another disadvantage of known conveyors lies in the arrangement of the two supporting elements on each frame which are so positioned that it is difficult to place them in the proper position on the guides.

These inconveniences are remedied by the present invention, according to which guiding and conveying elements, or at least some of them, move parallel to the mould frames and consist of one or more conveying chains and rotating arms which cooperate with the support elements of the frame. The frames slide smoothly as they shift from being guided by means of a horizontal conveying plane to being guided by means of a chain and arm, in a vertical path, the arrangement of the invention permitting the supporting elements of the frame to enter into loose engagement with the chain and the arm, just before the guiding of the frame along the horizontal conveying plane comes to an end. As the horizontal guiding movement ends, the supporting element of the frame enters into firmer engagement with the chain and the arm. To this end, each supporting element may, according to the invention, have a finger with a cross section corresponding to the opening in a chain link. One may, however, according to the invention, form each supporting element as a pivot pin extending at right angles to the direction of movement, which pivot pin cooperates with a forked device on each rotating arm or on certain of the chain links. This is especially advantageous if the conveyor is to be used in connection with conveying wheels, arranged in pairs, one of which changes the direction of movement of the conveyor, while the other, by engaging a cross pivot pin in each frame, determines the position of the frame in space during the change of conveying direction. In this arrangement the same cross pivot pin on the frames may cooperate both with the conveying chains and the said wheels. In order that the gearing between the pivot pin and chain will not enter into firm engagement too quickly, one may, according to the invention, arrange the forked device in V-form. In this way firm engagement between the parts occurs only when the pivot pin has entered entirely into the bottom of the forked device, i. e., after the frame has left the horizontal conveying plane.

In certain cases it may be desirable to bring about a double-sided guiding of the mould frame, especially along the stretches where its motion is not rectilinear, and in such cases one may, according to the invention, furnish each mould-frame with two supporting elements, one of which consists of a pivot pin directed across the direction of movement placed at each side of the axis of rotation of the mould frame, whereby the said pivot pin may be in gear with a revolving arm, and the other supporting element may cooperate with a circular conveying surface. With this arrangement, the aforementioned forked devices on the ends of the revolving arms can be generally eliminated, since, according to this form of the invention, it is only necessary to provide the revolving arms with a finger to support the pivot pin of the mould frame. This finger will, by its pressure against the pivot of the mould frame in cooperation with the pressure of the circular conveying surface against the other pivot of the mould frame, at all times determine the angular position of the mould frame in space. Since there is a possibility that the pivot of the mould frame may frictionally engage the circular conveying surface, one may mount this surface in such a way that it will oscillate freely about its center against a counter-weight or a spring, which urges the surface back to its initial position.

In the transition from rectilinear horizontal motion of the mould frame along a guiding iron band to circular motion, difficulties may arise in determining the angular position of the mould frame in space, if the horizontal guiding iron lies on the same side of the mould as do the revolving arms. Such difficulties are, however, avoided by placing the horizontal guiding elements near the said revolving arms along the side of the mould which turns away from the arms, whereby the guiding iron may be made as long as desired, since the mould remains on the same side of the plane of the guiding iron.

In the drawing are shown some illustrative embodiments of the invention.

Fig. 1 is a vertical sectional view through the conveyor on the line I—I of Fig. 2;

Fig. 2 is a horizontal sectional view through the conveyor on the line II—II of Fig. 1, Fig. 3 is a perspective view of a detail of the conveyor in greater scale, and Fig. 4 is a perspective view of a detail of another embodiment.

Each mould frame 1 is rotatably suspended on pivots 2 between a pair of parallel conveying chains 3, which move synchronously. After having moved in a horizontal direction with its lower edge reposing on a guiding iron 4, the mould frame, which is adapted to carry chocolate mould (not shown) or the like, slides free of the guiding iron 4, as the links of the chain 3 which carries the frame 2, pass around a chain wheel 7, which rotates on a pivot 6, mounted on the frame 5 of the apparatus.

An arm 11 is rotatably mounted on a fixed pivot 12, and is moved in synchronism with chain wheel 7 by a chain 8, carried by two chain wheels 9 and 10 of equal size. Arm 11 is formed with a forked end 13 which engages a support element on the mould frame 1 as the frame 1 slides free of guiding iron 4. The support element consists of a pivot pin 14, which is mounted in an arm 15 secured to the mould frame. As the chains 3 turn about chain wheels 7, the forked end 13 of synchronously-rotating arm 11 firmly holds the pivot pin 14 so that the mould frame 1 is maintained in a horizontal position at all times. The effective length of the arm 11 corresponds to the radius of the circle in which the axis of the pivot 2 is moved as chains 3 pass around chain wheels 7.

As the mould frame 1 approaches the position shown in Fig. 2 a pivot pin 16 on the opposite side of the mould frame with respect to pivot pin 14, engages a chain 17, which passes over two chain wheels 18 and 19 having the same radius and the same wheel spacing as the chain wheel 7 and chain wheel 20, placed vertically above wheel 7 and over which the conveying chain 3 is conducted. The chain 17 serves as the conveying means for the mould frame 1, when upon upward movement it is carried free of the arm 11, which, upon continued synchronous rotation, engages a new mould, indicated by a line 22.

The two chains 3 and 17 are driven at exactly the same speed by means of a chain 25, which is carried on two chain wheels 26 and 27 of equal size mounted on the shafts of wheel 20 and driving wheel 18, respectively, and the horizontal position of the mould frame 1 is maintained by the engagement of the pivot pin 16 with the chain 17, which for this purpose is provided with forked devices 23 as shown in Fig. 3, fastened to the side of certain links 24 of the chain.

When the mould frame has reached the upper position in Fig. 1 the conveying chain links carrying pivots 2 engage upon wheel 20, and simultaneously a finger 28 on a revolving arm 29, corresponding to the arm 11, engages the under side of pivot pin 14, and as a result the left side of the mould frame is prevented from being tipped downwardly. In a similar way means are provided for preventing the right side of the mould frame from being tipped downwardly, viz., the pivot pin 16 slides upon an arcuate iron band 30, having an axis of rotation on the same level with the axis of rotation of the wheel 20 and having a radius equal to the effective length of arm 29.

As the frame 1 is carried along, the pivot pin 16 is led over the curved iron band 30 with as little friction as possible, but if the friction is too great to prevent the pivot pin 16 from sliding, the iron band 30 will merely turn with the pin a sufficient distance to permit disengagement, whereupon the iron band 30 is rotated back to its initial position, shown in Fig. 1, under the influence of a counter-weight 31.

When the mould frame 1 has been carried to the highest point on wheel 20, its upper edge strikes a horizontal guiding iron 32, which guides the mould frame, until the frame slides upon another horizontal guiding iron 33, which supports the mould and determines its angular position in space during the subsequent horizontal movement.

The guiding chain 17, moving in the direction shown by the arrow 34, may, however, also be used for guiding another series of mould frames moving vertically downwards as suggested by line 35.

The forked ends 13 of arm 11 as well as the forked device 23 in Fig. 3 have the illustrated V-form in order that they will engage pivot pins 14 and 16 in such a way that the engagement is at first proportionally loose, but afterwards becomes firm as the pivot pin slides to the bottom of the V-formed cut-outs.

If there is danger that the foremost edge of the forked end will strike the pivot pin because the forked end has been moved too slowly, the finger 28 on the revolving arm 29 shown in Fig. 1 is preferred, but this finger requires, on the other side of the mould frame, use of an arcuate iron band 30 or another equivalent guiding means.

The forked devices 23 of the chain 17 may also be replaced by a finger of this type but in that case it will be necessary to provide a second conveying chain symmetrical with the chain 17 and placed around the vertical part of the conveying chain 3, which makes the apparatus more complicated.

Furthermore, the support element on the mould frame 1 may cooperate in some other way with the conveying chain 17. For example, as shown in Fig. 4, the support element may have a finger 36, which enters into the openings in the links of the chain 17, the finger of course having a cross-section generally corresponding to the cross-section of the openings.

Having now described my invention, what I claim as new and desire to secure by Letters Patent is:

1. A tray conveyor mechanism comprising two horizontally spaced pairs of vertically spaced sprockets, a pair of endless conveyor chains each supported at one end thereof by a vertically spaced pair of said sprockets, said chains each forming an upper and a lower horizontal run connected by a vertical run, a plurality of spaced material holding trays pivotally secured for free rotation between said chains, first means for maintaining said trays in a horizontal position associated with said upper and lower horizontal runs respectively, second means for maintaining said trays in horizontal position at the turns from the horizontal to the vertical and from the vertical to the horizontal runs respectively, and third means for maintaining in horizontal position said trays for said vertical run.

2. A mechanism according to claim 1, wherein said first maintaining means for the upper and lower horizontal runs comprises tray guiding members disposed adjacent to and parallel to the upper and lower chain portions respectively.

3. A mechanism according to claim 1, wherein said second maintaining means includes a rotating arm each for the upper and lower turns respectively, a first portion on each of said arms and on one side of each of said trays for engagement of one by the other portion, and means for maintaining synchronism of rotation between said arms and said sprockets.

4. A mechanism according to claim 3, wherein said second maintaining means further includes for the upper turn an arcuate guiding member and a second portion on the other side of each of said trays for engagement thereby, said arcuate member being rotatably disposed and having means for resisting rotation by said second portion.

5. A mechanism according to claim 1, wherein said third maintaining means comprises an endless chain and means for driving said chain substantially in synchronism with and parallel to the vertical run of at least one of said conveyor chains, and portions on each of said trays for engagement by said endless chain during the vertical run.

6. A tray conveyor mechanism comprising two horizontally spaced pairs of vertically spaced sprockets, a pair of endless conveyor chains each supported at one end thereof by a vertically spaced pair of said sprockets, said chains each forming an upper and a lower horizontal run connected by a vertical run, a plurality of spaced material holding trays pivotally secured for free rotation between said chains, at least one tray guiding member respectively for said upper and said lower run disposed parallel thereto, a rotatable arm each associated with each of one of a pair of said vertically spaced sprockets for maintaining said trays in a horizontal position in respect to the lower and upper turns, an arcuate guiding member associated with an upper sprocket, an endless chain disposed to be driven adjacent and parallel to the vertical run of one of said conveyor chains, and a portion on each of said trays for successively coacting with said arms and a portion for coacting with said endless chain and said arcuate members respectively.

7. A mechanism according to claim 6, wherein said arcuate member is rotatably disposed and includes means for resisting rotation upon engagement with said trays.

KAI CHRISTIAN SOPHUS AASTED.

REFERENCES CITED

The following references are of record in the file of this patent:

UNITED STATES PATENTS

| Number | Name | Date |
| --- | --- | --- |
| 2,242,813 | Cook | May 20, 1941 |
| 2,390,455 | Nalbach | Dec. 4, 1945 |
| 2,414,164 | Nalbach | Jan. 14, 1947 |